(12) United States Patent
Peng et al.

(10) Patent No.: US 10,335,741 B2
(45) Date of Patent: Jul. 2, 2019

(54) METHOD FOR PREPARING THE NETWORK-PORE POLYVINYLIDENE FLUORIDE MEMBRANE BASED ON POLYVINYL ALCOHOL GEL

(71) Applicant: JIANGSU KAIMI MEMBRANE TECHNOLOGY CO., LTD, Nanjing, Jiangsu (CN)

(72) Inventors: Na Peng, Singapore (SG); Huailin Wang, Jiangsu (CN); Jinming Yun, Jiangsu (CN); Min Cao, Jiangsu (CN); Hang Yin, Jiangsu (CN); Liangjing Shi, Jiangsu (CN)

(73) Assignee: JIANGSU KAIMI MEMBRANE TECHNOLOGY CO., LTD, Nanjing, Jiangsu (CN)

( * ) Notice: Subject to any disclaimer, the term of this patent is extended or adjusted under 35 U.S.C. 154(b) by 0 days.

(21) Appl. No.: 15/572,748

(22) PCT Filed: Aug. 2, 2016

(86) PCT No.: PCT/CN2016/092981
§ 371 (c)(1),
(2) Date: Nov. 8, 2017

(87) PCT Pub. No.: WO2017/050019
PCT Pub. Date: Mar. 30, 2017

(65) Prior Publication Data
US 2018/0154314 A1    Jun. 7, 2018

(30) Foreign Application Priority Data
Sep. 21, 2015 (CN) .......................... 2015 1 0605509

(51) Int. Cl.
*B01D 67/00* (2006.01)
*B01D 71/34* (2006.01)
*B01D 69/02* (2006.01)

(52) U.S. Cl.
CPC ...... *B01D 67/0013* (2013.01); *B01D 67/0011* (2013.01); *B01D 69/02* (2013.01);
(Continued)

(58) Field of Classification Search
CPC ............ B01D 67/0013; B01D 67/0011; B01D 69/02; B01D 71/34; B01D 2323/08; B01D 2323/18; B01D 2323/12
See application file for complete search history.

(56) References Cited

U.S. PATENT DOCUMENTS

| 5,022,990 A | 6/1991 | Doi et al. |
| 6,013,688 A | 1/2000 | Pacheco et al. |
| 6,299,773 B1 | 10/2001 | Takamura et al. |

FOREIGN PATENT DOCUMENTS

| CN | 101269302 A | 9/2008 |
| CN | 101559333 A | 10/2009 |

(Continued)

*Primary Examiner* — Robert J Grun
(74) *Attorney, Agent, or Firm* — Novick, Kim & Lee, PLLC; Allen Xue (57) ABSTRACT

A method for preparing the network-pore polyvinylidene fluoride membrane based on polyvinyl alcohol (PVA) gel includes the steps of (1) mix and stir PVA, masking agent and solvent, heat and dissolve the mixture evenly under 105 degree Celsius to obtain a PVA solution; (2) in the PVA solution, add PVDF and pore-forming agent, where the rest shall be added with the solvent until the total mass fraction sum is 1, stir, heat and dissolve the solution evenly to obtain the homogeneous casting solution; (3) the casting solution is filtered, deaerated, phase-separated and solidified as membrane A; (4) removes the PVA gel from membrane A to obtain membrane B; (5) membrane B is washed with water (Continued)

to remove the residual solvent to obtain the PVDF membrane with network-pore structure. The resulting PVDF membrane is an asymmetric membrane with an ultra-thin cortex and an interpenetrating network-pore sub-cortex structure.

7 Claims, 6 Drawing Sheets

(52) U.S. Cl.
    CPC .......... *B01D 71/34* (2013.01); *B01D 2323/08* (2013.01); *B01D 2323/12* (2013.01); *B01D 2323/18* (2013.01)

(56) References Cited

FOREIGN PATENT DOCUMENTS

| | | | |
|---|---|---|---|
| CN | 102658037 | A | 9/2012 |
| CN | 102764597 | A | 11/2012 |
| CN | 102764598 | A | 11/2012 |
| CN | 102872730 | A | 1/2013 |
| CN | 104043344 | A | 9/2014 |
| CN | 104607063 | A | 5/2015 |

METHOD FOR PREPARING THE NETWORK-PORE POLYVINYLIDENE FLUORIDE MEMBRANE BASED ON POLYVINYL ALCOHOL GEL

FIELD OF THE INVENTION

This Invention relates to the field of polymeric membrane product preparation, especially for a method for preparing the network-pore polyvinylidene fluoride membrane based on polyvinyl alcohol gel.

BACKGROUND OF THE INVENTION

The polyvinylidene fluoride is a thermoplastic fluorinated polymeric membrane material with excellent weather resistance and chemical stability, which will not be corroded by acid, alkali and other strong oxidants and halogen, and it has high strength and wear resistance, widely used in industry, municipal wastewater treatment, medicine, food, gas filtration, molecular transfer printing technology and other industrial fields, which has wide development prospects and market values.

The polyvinylidene fluoride is mainly used for microfiltration and nanofiltration in the field of membrane, and its preparation processes are mainly the non-solvent induced phase separation (NIPS) and the thermal induced phase separation (TIPS). At present, the TIPS method is used more widely in industry, and this method uses the casting solution to make double diffusion and mass transfer of solvent/non-solvent with the surrounding, to change the originally homogeneous and stable solution to an unstable status. Thus the phase transformation occurs and it is phase-separated and solidified as the membrane finally. The polyvinylidene fluoride membranes used in the market are mostly prepared by this method, but this method also has some shortcomings, mainly including that there are often finger-like pores in the membrane pore structure, which will reduce mechanical strength and service life of the membrane. And the thermal induced phase separation (TIPS) mainly makes the phase separation by cooling, to form the pore structure, where the prepared membrane has a high strength, a membrane pore structure of homogeneous network-pore structure and other advantages, but this method has a high requirement for equipment, large energy consumption and a more difficult preparation method.

American patent U.S. Pat. Nos. 5,022,990 and 6,299,773 mix polyvinylidene fluoride resin, organic liquid and inorganic granular material, and after melting in a high temperature, a hollow fiber membrane and the likes are formed by model molding, to form a three dimensional network structure. But the addition of the inorganic granular material will reduce the mechanical strength of the membrane and the inorganic granular materials are difficult to be extracted in later period. American patent U.S. Pat. No. 6,013,688 adopts the acetone as the solvent and prepares a polyvinylidene fluoride membrane with good penetrability and high porosity through the non-solvent induced phase separation. But this technology needs to dissolve the polyvinylidene fluoride near the boiling point of acetone and the acetone is a volatile toxic substances, resulting in a large difficulty in industrial actual operation. Chinese patent CN104607063A uses the strong hydrophilic property of polyvinyl alcohol to modify the polyvinylidene fluoride membrane, adopts the blend polyvinyl alcohol, crosslinks and stabilizes the polyvinyl alcohol in the membrane, to form a network structure with the main polyvinylidene fluoride and retain its permanent hydrophilic property.

DESCRIPTION OF THE INVENTION

The purpose of this Invention is to provide the method for preparing the network-pore polyvinylidene fluoride (PVDF) membrane based on polyvinyl alcohol (PVA) gel, which solves problems in existing technologies, such as finger-like pores and reduction of mechanical strength caused by the non-solvent induced phase separation, high requirements for equipment and large energy consumption caused by the thermal induced phase separation, etc.

The technical proposal adopted by this Invention is to control the forming condition of PVA gel, where the gel will not form in the homogeneous casting solution due to the masking agent (masking the reaction of the hydroxyl in the PVA and the hydrogen bond formed in the solvent) and high temperature effect and the PVA gel will form in the phase inversion and phase separation process due to the loss of the masking agent and the drop in temperature, and the PVA three dimensional network gel will solidify poor and rich phase formed in the PVDF membrane phase separation and form a interpenetrating network structure with the rich phase. After the phase separation is completed, remove the PVA gel through the post-treatment process and form a PVDF membrane with network structure of good penetrability finally. The main steps include:

A method for preparing the network-pore polyvinylidene fluoride membrane based on polyvinyl alcohol gel, which mainly includes:

(1) Mix and stir PVA, masking agent and solvent according to a certain mass ratio, i.e. 0.5-5%, 1-8%, 30-60%, heat and dissolve the mixture evenly under 105 degree Celsius, to obtain the PVA solution;

(2) In the aforementioned PVA solution, add PVDF of 10-30% and pore-forming agent of 1-10%, where the rest shall be added with the solvent until the total mass fraction sum is 1, stir, heat and dissolve the solution evenly under 80 degree Celsius, to obtain the homogeneous casting solution;

(3) The casting solution is filtered, deaerated and coated on a smooth clean glass plate with the coating thickness of 250 μm in a closed environment for membrane making with a temperature of 20-40 degree Celsius and a humidity of 40-70%, and then after staying in the air for 10-45 s, it is placed in the gel bath of 20-50 degree Celsius to be phase-separated and solidified as the membrane A;

(4) The membrane A is treated by the post-treatment process to remove the PVA gel, to obtain the membrane B;

(5) The membrane B is washed with water to remove the residual solvent, to obtain the PVDF membrane with network-pore structure.

Firstly, this Invention mixes and stirs PVA, masking agent and solvent according to a certain mass ratio, heats and dissolves the mixture evenly under 105 degree Celsius, to obtain the PVA solution, the purpose of which is to mask the reaction of the hydroxyl in the PVA and the hydrogen bond formed in the solvent. The addition of masking agent contributes to the formation of the homogeneous casting solution.

Further, the polymerization degree of PVA in said step (1) is 300-2400 and the alcoholysis degree is 70%-100%. The polymerization degree of PVA controlled in this Invention is 300-2400 and the alcoholysis degree is 70%-100%, because the intersolubility between PVA and PVDF will be affected if the polymerization degree of PVA >2400 and the crosslinking degree of PVA will be insufficient if the polymerization degree of PVA <300. It is certified by many experiments that the use of PVA of this specification contributes to the formation the homogeneous casting solution and the prepared membrane has an even surface aperture.

Further, the masking agent in said step (1) is one or several of lithium perchlorate, lithium chloride, lithium nitrate, zinc chloride and calcium chloride.

Further, the solvent in said step (1) is one or a combination of several of formamide, N,N-dimethylacetamide, N,N-dimethylformamide, N-methylpyrrolidone and dimethyl sulfoxide.

Further, the weight-average molecular weight of PVDF in said step (2) is 300-800 thousand Dalton and the intrinsic viscosity is 1.65-1.90.

Further, the pore-forming agent in said step (2) is one or a combination of several of polyethylene glycol, hydroxymethyl cellulose, methyl acrylate, polyvinylpyrrolidone, inorganic salt, glycerin and octanol.

Further, the solvent in said step (2) is one or a combination of several of triethyl phosphate, formamide, N,N-dimethylacetamide, N,N-dimethylformamide, N-methylpyrrolidone and dimethyl sulfoxide.

Further, the gel bath in said step (3) is one or a combination of several of pure water gel bath, isopropanol/water mixed solution and solvent/water mixed solution.

Further, the post-treatment process in said step (4) is a soaking treatment for 8-36 h in pure water of 40-100 degree Celsius or a soaking treatment for 2-12 h in a sodium hypochlorite solution of 30-60 degree Celsius and 100-5000 ppm, or a combination of the aforementioned two methods. The adoption of the soaking treatment in pure water of 40-100 degree Celsius is because the PVA is easy for swelling in water, and thus it can be removed; the adoption of the treatment in a sodium hypochlorite solution of 30-60 degree Celsius and 100-5000 ppm is because the sodium hypochlorite can oxidize the PVA and destroy its structure, and thus it can be removed.

Further, said sodium hypochlorite solution adopts a sodium hypochlorite solution of 30 degree Celsius and 500 ppm.

The beneficial effects for adopting the technical proposals of this Invention are: that this Invention provides a method for preparing the network-pore polyvinylidene fluoride membrane based on polyvinyl alcohol gel, and through a simple and feasible method, it prepares a series of PVDF membrane with controllable structure. The cross section structure of this PVDF membrane is an asymmetric membrane with an ultra-thin cortex and an interpenetrating network-pore sub-cortex structure, where there is a good penetrability between pores. This method can be operated simply, save the energy consumption and reduce the cost, and the prepared membrane has a good penetrability between pores, a large flux, a high mechanical strength and other excellent performances, which can be used in municipal wastewater treatment, industrial wastewater treatment and other fields.

DETAILED DESCRIPTION OF THE PREFERRED EMBODIMENTS

This Invention will be described in further detail in conjunction with specific embodiments as follows Embodiment 1

Figure 1:
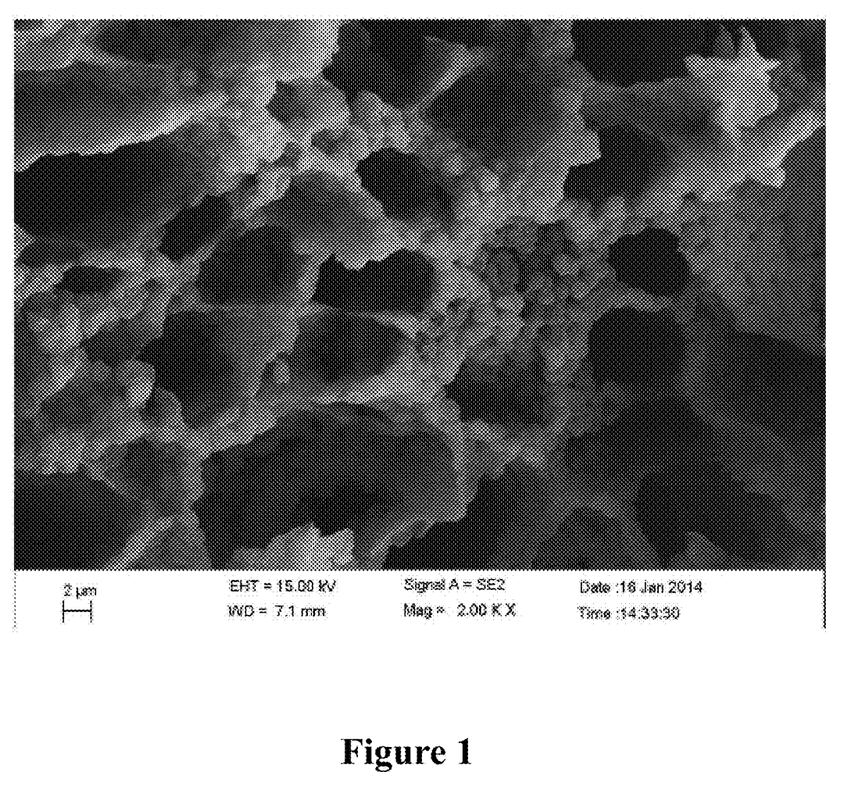
FIG. 1 is a scanning electronic microscope image of cross section of PVDF membrane prepared in embodiment 1 of this Invention.

Firstly, dissolve 2 g PVA in 18 g DMSO organic solvent and stir it under 105 degree Celsius, dissolved evenly. Then, add 54 g DMF and 8 g lithium chloride and continue stirring until dissolved evenly, cooled to the normal temperature. Then, add 15 g PVDF and 3 g polyethylene glycol pore-forming agent, and stir for 12 h under 80 degree Celsius, dissolved evenly and placed for deaeration; on a smooth clean glass plate, make the coating in an air environment with a temperature of 30 degree Celsius and a humidity of 60% by a scraper with a thickness of 250 μm, where the time for staying in the air shall be controlled as 10 s, and place it in the pure water gel bath of 30 degree Celsius to be phase-separated and solidified as the membrane; then, the obtained membrane is soaked for 24 h in hot water of 70 degree Celsius; finally, remove the residual solvent to obtain the polyvinylidene fluoride membrane with network-pore structure, which has a good network penetrability and a pure water flux of 915 LMH (1 bar, 25 degree Celsius).

Embodiment 2

Figure 2:
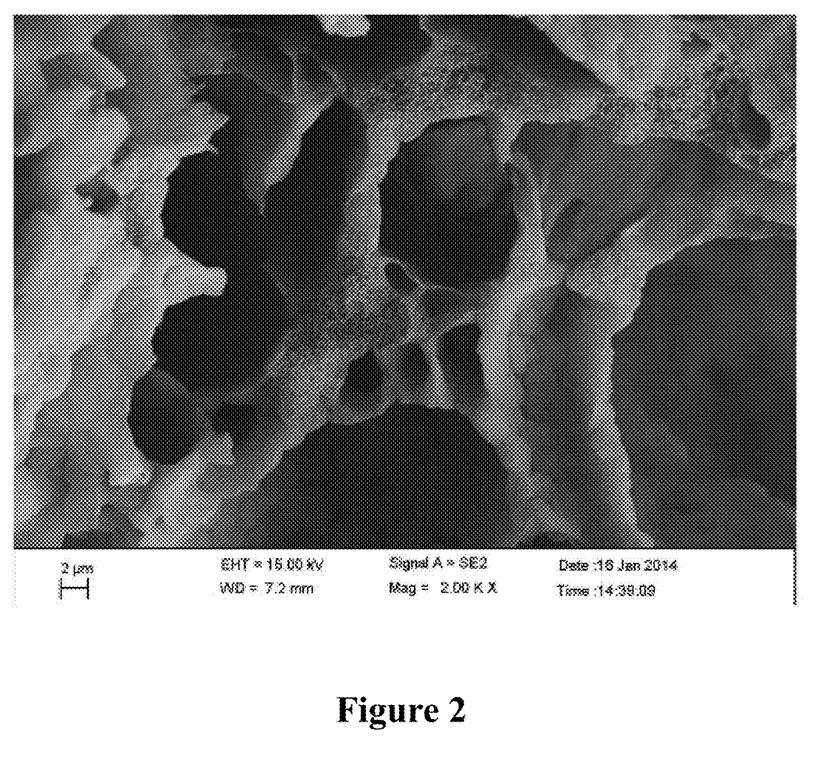
FIG. 2 is a scanning electronic microscope image of cross section of PVDF membrane prepared in embodiment 2 of this Invention.

Firstly, dissolve 0.5 g PVA in 18 g DMSO organic solvent and stir it under 105 degree Celsius, dissolved evenly. Then, add 54 g DMF and 1 g lithium chloride and continue stirring until dissolved evenly, cooled to the normal temperature. Then, add 10 g PVDF, 10 g PVP pore-forming agent and 6.5 g DMF, and stir for 12 h under 80 degree Celsius, dissolved evenly and placed for deaeration; on a smooth clean glass plate, make the coating in an air environment with a temperature of 30 degree Celsius and a humidity of 60% by a scraper with a thickness of 250 μm, where the time for staying in the air shall be controlled as 10 s, and place it in the pure water gel bath of 30 degree Celsius to be phase-separated and solidified as the membrane; then, the obtained membrane is soaked for 24 h in hot water of 70 degree Celsius; finally, remove the residual solvent to obtain the polyvinylidene fluoride membrane with network-pore structure, which has a pure water flux of 1007 LMH (1 bar, 25 degree Celsius).

Embodiment 3

Figure 3:
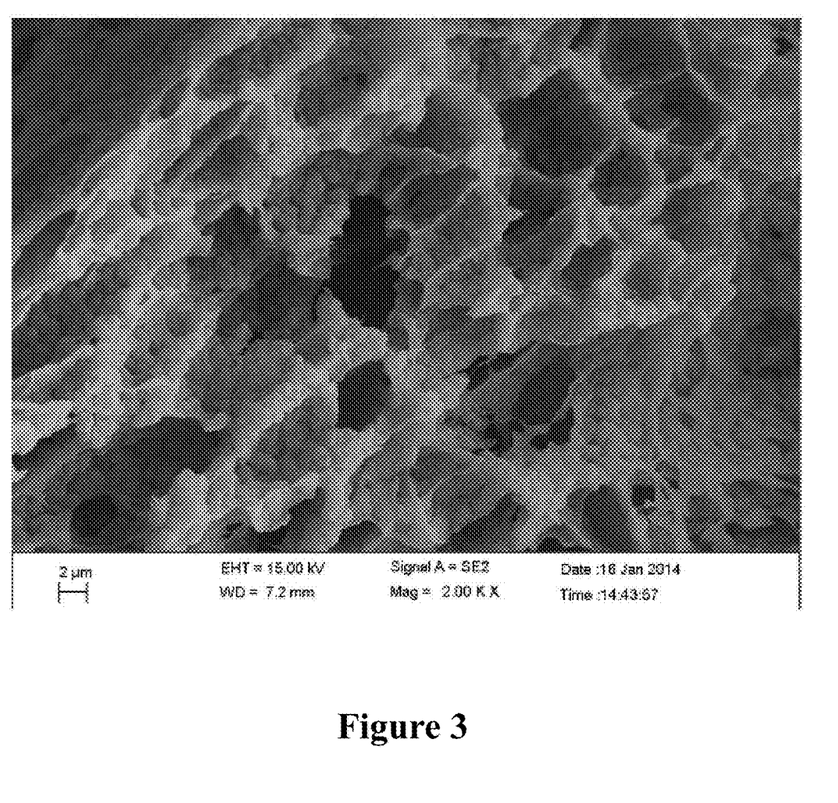
FIG. 3 is a scanning electronic microscope image of cross section of PVDF membrane prepared in embodiment 3 of this Invention.

Firstly, dissolve 5 g PVA in 33.5 g DMSO organic solvent and stir it under 105 degree Celsius, dissolved evenly. Then, add 33.5 g DMF and 5 g lithium chloride and continue stirring until dissolved evenly. Then, add 20 g PVDF and 3 g PVP pore-forming agent, and stir for 12 h under 80 degree Celsius, dissolved evenly and placed for deaeration; on a smooth clean glass plate, make the coating in an air environment with a temperature of 20 degree Celsius and a humidity of 40% by a scraper with a thickness of 250 μm, where the time for staying in the air shall be controlled as 10 s, and place it in the pure water gel bath of 20 degree Celsius to be phase-separated and solidified as the membrane; then, the obtained membrane is soaked for 8 h in hot water of 100 degree Celsius; finally, remove the residual solvent to obtain the polyvinylidene fluoride membrane with network-pore structure, which has a pure water flux of 374 LMH (1 bar, 25 degree Celsius).

Embodiment 4

Figure 4:
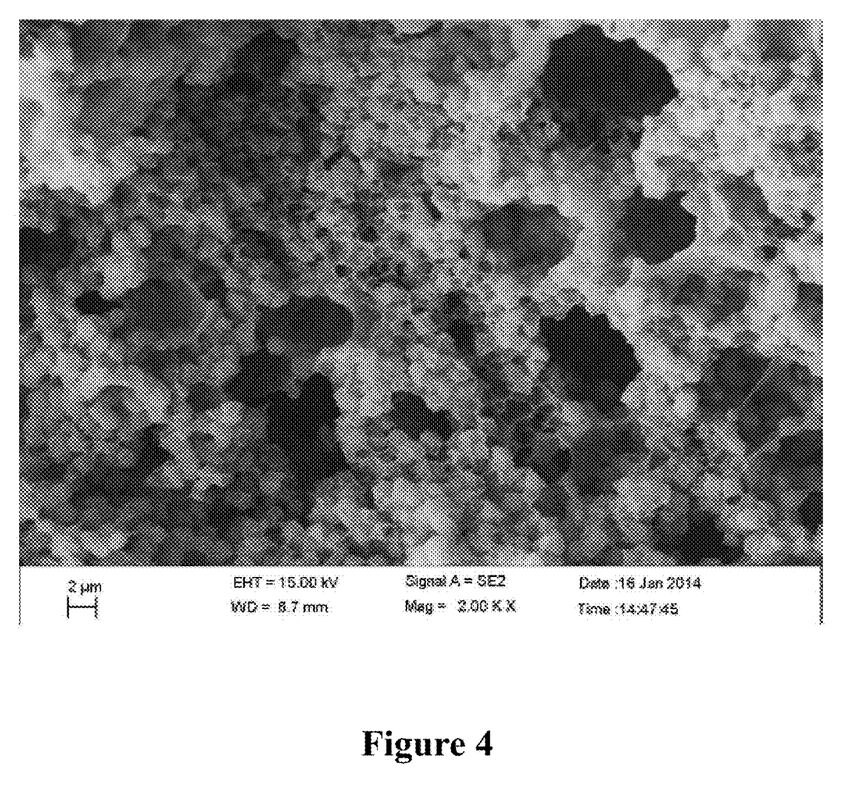
FIG. 4 is a scanning electronic microscope image of cross section of PVDF membrane prepared in embodiment 4 of this Invention.

Firstly, dissolve 2 g PVA in 22 g DMSO organic solvent and stir it under 105 degree Celsius, dissolved evenly. Then, add 43 g DMF and 2 g lithium chloride and continue stirring until dissolved evenly. Then, add 30 g PVDF and 1 g PVP pore-forming agent, and stir for 12 h under 80 degree Celsius, dissolved evenly and placed for deaeration; on a smooth clean glass plate, make the coating in an air environment with a temperature of 30 degree Celsius and a humidity of 70% by a scraper with a thickness of 250 μm, where the time for staying in the air shall be controlled as 30 s, and place it in the pure water gel bath of 30 degree Celsius to be phase-separated and solidified as the membrane; then, the obtained membrane is soaked for 8 h in a NaClO solution of 30 degree Celsius and 500 ppm; finally, remove the residual solvent by pure water soaking to obtain the polyvinylidene fluoride membrane with network-pore structure, which has a pure water flux of 458 LMH (1 bar, 25 degree Celsius).

The NaClO solution in this Embodiment may also be 60 degree Celsius and 100 ppm; or 30 degree Celsius and 5000 ppm The soaking time of NaClO solution in this Embodiment may also be 2 h.

Embodiment 5

Figure 5:
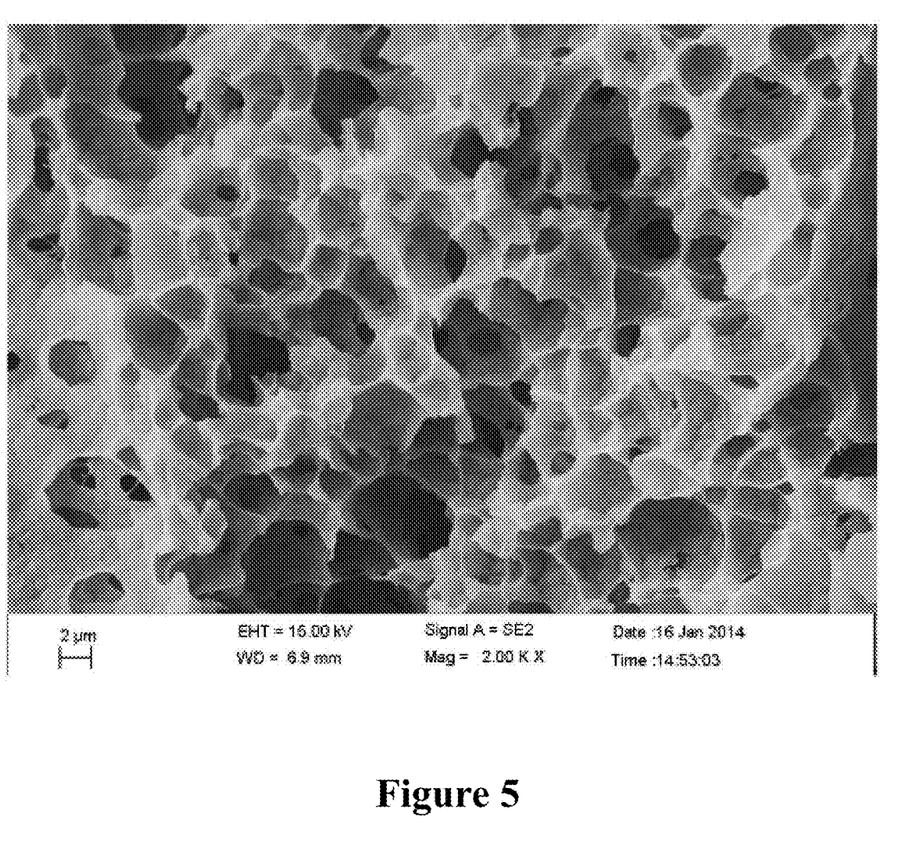
FIG. 5 is a scanning electronic microscope image of cross section of PVDF membrane prepared in embodiment 5 of this Invention.

Firstly, dissolve 2 g PVA in 31 g DMSO organic solvent and stir it under 105 degree Celsius, dissolved evenly. Then, add 47 g DMF and 2 g lithium chloride and continue stirring until dissolved evenly. Then, add 15 g PVDF and 3 g PVP pore-forming agent, and stir for 12 h under 80 degree Celsius, dissolved evenly and placed for deaeration; on a smooth clean glass plate, make the coating in an air environment with a temperature of 30 degree Celsius and a humidity of 40% by a scraper with a thickness of 250 μm, where the time for staying in the air shall be controlled as 30 s, and place it in the pure water gel bath of 50 degree Celsius to be phase-separated and solidified as the membrane; then, the obtained membrane is soaked for 24 h in hot water of 60 degree Celsius; finally, remove the residual solvent to obtain the polyvinylidene fluoride membrane with network-pore structure, which has a pure water flux of 547 LMH (1 bar, 25 degree Celsius).

Embodiment 6

Figure 6:
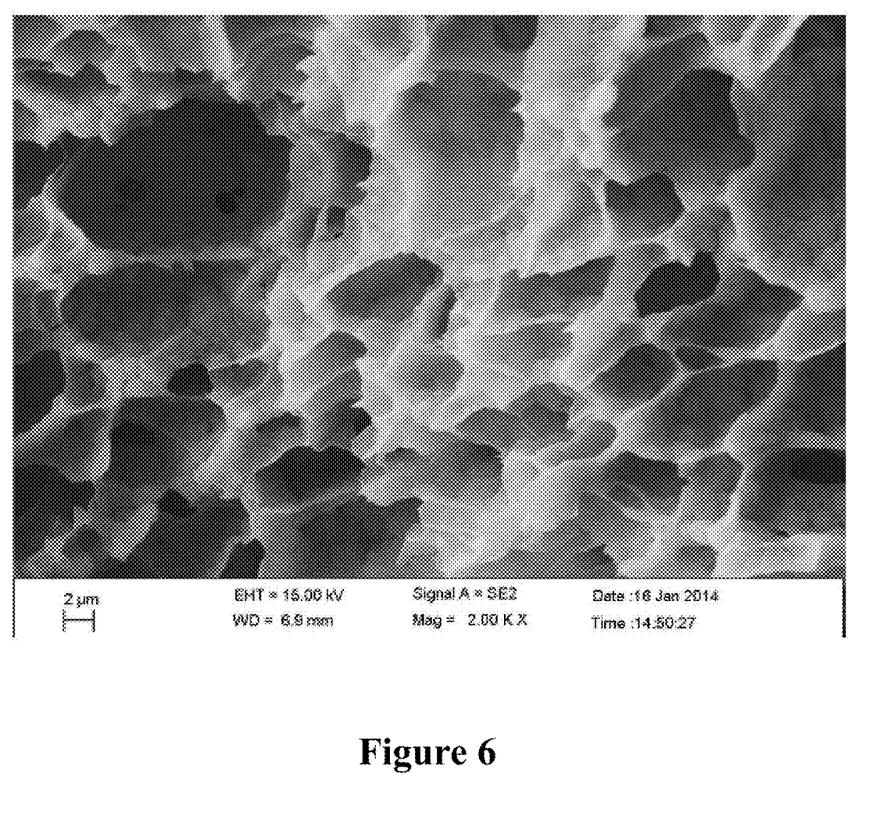
FIG. 6 is a scanning electronic microscope image of cross section of PVDF membrane prepared in embodiment 6 of this Invention.

Firstly, dissolve 2 g PVA in 31 g DMSO organic solvent and stir it under 105 degree Celsius, dissolved evenly. Then, add 47 g DMF and 2 g lithium chloride and continue stirring until dissolved evenly. Then, add 15 g PVDF and 3 g PVP pore-forming agent, and stir for 12 h under 80 degree Celsius, dissolved evenly and placed for deaeration; on a smooth clean glass plate, make the coating in an air environment with a temperature of 40 degree Celsius and a humidity of 50% by a scraper with a thickness of 250 μm, where the time for staying in the air shall be controlled as 45 s, and place it in the 40% isopropanol/water gel bath of 50 degree Celsius to be phase-separated and solidified as the membrane; the obtained membrane is soaked for 36 h in hot water of 40 degree Celsius at first and then it is soaked for 12 h in a NaClO solution of 30 degree Celsius and 500 ppm; finally, remove the residual solvent to obtain the polyvinylidene fluoride membrane with network-pore structure, which has a pure water flux of 682 LMH (1 bar, 25 degree Celsius).

In this Embodiment, the alcohol/water gel bath selects the isopropanol/water gel bath, and other alcohol/water gel baths applicable to this Invention are included in the protection range of this Invention.

In the aforementioned Embodiments 1-6, the polymerization degree of PVA is 300-2400 and the alcoholysis degree is 70%-100%.

In the aforementioned Embodiments 1-6, the weight-average molecular weight of PVDF is 300-800 thousand Dalton and the intrinsic viscosity is 1.65-1.90.

In the aforementioned Embodiments 1-6, the masking agent adopts the preferred lithium chloride, and the others such as lithium perchlorate, lithium nitrate, zinc chloride, calcium chloride or their combinations are applicable to this Invention and are included in the protection range of this Invention.

In the aforementioned Embodiments 1-6, the solvent prefers DMSO and DMF, and the others such as formamide, N,N-dimethylacetamide, N-methylpyrrolidone, triethyl phosphate or their combinations are applicable to this Invention and are also included in the protection range of this Invention.

In the aforementioned Embodiments 1-6, the pore-forming agent prefers polyvinylpyrrolidone and polyethylene glycol, and the others such as hydroxymethyl cellulose, methyl acrylate, inorganic salt, glycerin and octanol are applicable to this Invention and are also included in the protection range of this Invention.

In the aforementioned Embodiments 1-6, the gel bath prefers pure water gel bath and isopropanol/water mixed solution, and the other alcohol/water mixed solutions and solvent/water mixed solutions are also applicable to this Invention and are also included in the protection range of this Invention.

Although the aforementioned Embodiments have described the technical proposals of this Invention in detail, the technical proposals of this Invention shall not be limited in the aforementioned Embodiments. Without departing from ideas and purposes of this Invention, any modification to the technical proposals of this Invention will be included in the range limited by the Claims of this Invention.

The invention claimed is:

1. A method for preparing the network-pore polyvinylidene fluoride membrane comprising:
   (1) preparing a polyvinyl alcohol (PVA) solution by heating and stirring a mixture under 105 degree Celsius, wherein the mixture comprises a PVA, a masking agent, and a solvent, wherein the PVA has a polymerization degree of 300-2400 and an alcoholysis degree of 70%-100%, and wherein the masking agent is selected from the group consisting of lithium perchlorate, lithium chloride, lithium nitrate, zinc chloride, calcium chloride, and mixtures thereof;
   (2) adding a polyvinylidene fluoride (PVDF) and a pore-forming agent to the PVA solution, stirring and heating the PVA solution under 80 degree Celsius to obtain a casting solution;
   (3) filtering and deaerating the casting solution; coating the casting solution on a smooth clean glass plate to form a film having a thickness of 250 μm at a temperature of 20-40 degree Celsius and a humidity of 40-70%; drying the film in air for 10-45 s; placing the film in a gel bath at 20-50 degree Celsius to phase-separate and solidify the film to form a membrane A;

(4) treating the membrane A in a post-treatment process to remove PVA gel from the membrane A to obtain membrane B; and (5) washing the membrane B with water to obtain the PVDF membrane, wherein the casting solution comprises, based on mass percentage, 0.5-5% of the PVA, 1-8% of the masking agent, 10-30% of the PVDF, 1-10% of the pore-forming agent, and the solvent being the balance of the casting solution.

2. The method of claim 1, wherein the solvent in said step (1) is selected from the group consisting of formamide, N,N-dimethylacetamide, N,N-dimethylformamide, N-methylpyrrolidone, dimethyl sulfoxide, and mixtures thereof.

3. The method of claim 1, wherein the PVDF in said step (2) has a weight-average molecular weight of 300-800 thousand Dalton an intrinsic viscosity of 1.65-1.90.

4. The method of claim 1, wherein the pore-forming agent in said step (2) is selected from the group consisting of polyethylene glycol, hydroxymethyl cellulose, methyl acrylate, polyvinylpyrrolidone, inorganic salt, glycerin, octanol, and mixtures thereof.

5. The method of claim 1, wherein the gel bath in said step (3) is a pure water gel bath or an isopropanol/water mixed solution.

6. The method of claim 1, wherein the post-treatment process in said step (4) comprises soaking the membrane A in pure water at 40-100 degree Celsius for 8-36 hrs or in a 100-5000 ppm sodium hypochlorite solution at 30-60 degree Celsius for 2-12 hrs.

7. The method of claim 6, wherein the post-treatment process in said step (4) comprises soaking the membrane A in a 500 ppm hypochlorite solution at 30 degree Celsius for 2-12 hrs.

* * * * *